United States Patent
Shen et al.

(10) Patent No.: US 8,625,286 B2
(45) Date of Patent: Jan. 7, 2014

(54) HOUSING OF PORTABLE ELECTRONIC DEVICE

(75) Inventors: Jun Shen, Shenzhen (CN); Hai-Feng Zhu, Shenzhen (CN); Ping Gao, Shenzhen (CN); Quan-Long Chen, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 643 days.

(21) Appl. No.: 12/878,229

(22) Filed: Sep. 9, 2010

(65) Prior Publication Data

US 2011/0227464 A1 Sep. 22, 2011

(30) Foreign Application Priority Data

Mar. 19, 2010 (CN) .......................... 2010 1 0127205

(51) Int. Cl.
| | |
|---|---|
| H05K 7/16 | (2006.01) |
| G06F 1/00 | (2006.01) |
| H05K 5/00 | (2006.01) |
| H04M 1/00 | (2006.01) |
| H04M 3/00 | (2006.01) |
| B65D 6/28 | (2006.01) |
| B65D 8/18 | (2006.01) |

(52) U.S. Cl.
USPC .................. 361/725; 361/679.43; 379/433.11; 220/4.02

(58) Field of Classification Search
USPC ............ 361/725, 726, 810, 813, 829, 679.43, 361/679.58, 732; 379/433.01, 433.07, 379/433.11; 455/575.1; 174/560, 561; 220/4.02; 206/706, 721
See application file for complete search history.

(56) References Cited

U.S. PATENT DOCUMENTS

| | | | | | |
|---|---|---|---|---|---|
| 3,155,767 | A | * | 11/1964 | Schellack | 174/260 |
| 4,158,745 | A | * | 6/1979 | Keller | 174/536 |
| 4,912,602 | A | * | 3/1990 | Zurek et al. | 361/752 |
| 5,262,923 | A | * | 11/1993 | Batta et al. | 361/679.37 |
| 5,371,791 | A | * | 12/1994 | Schwartz et al. | 379/433.01 |
| 5,548,483 | A | * | 8/1996 | Feldman | 361/737 |
| 6,801,268 | B2 | * | 10/2004 | Huang et al. | 361/679.21 |
| 7,405,950 | B2 | * | 7/2008 | Zhang et al. | 361/810 |
| 7,442,464 | B2 | * | 10/2008 | Li | 429/97 |
| 7,697,281 | B2 | * | 4/2010 | Dabov et al. | 361/679.55 |
| 7,859,831 | B2 | * | 12/2010 | Nakanishi et al. | 361/679.24 |
| 8,199,466 | B2 | * | 6/2012 | Shen et al. | 361/679.01 |
| 2006/0281501 | A1 | * | 12/2006 | Zuo et al. | 455/575.1 |
| 2007/0293282 | A1 | * | 12/2007 | Lewis et al. | 455/575.1 |
| 2008/0074036 | A1 | * | 3/2008 | Wang et al. | 313/504 |
| 2008/0146293 | A1 | * | 6/2008 | Kim | 455/575.1 |
| 2008/0165485 | A1 | * | 7/2008 | Zadesky et al. | 361/683 |
| 2009/0168311 | A1 | * | 7/2009 | Hung | 361/679.01 |
| 2009/0260969 | A1 | * | 10/2009 | Yasui | 455/575.1 |

OTHER PUBLICATIONS

Definition of "sheet" from www.merriam-webster.com provided Apr. 18, 2013.*

* cited by examiner

*Primary Examiner* — Chau Nguyen
*Assistant Examiner* — Roshn Varghese
(74) *Attorney, Agent, or Firm* — Altis Law Group, Inc.

(57) ABSTRACT

A housing of a portable electronic device includes a first frame unit, a second frame unit, and a panel unit. The first frame unit includes a plurality of retaining members. The second frame unit includes a plurality of fastening members. The panel unit includes a plurality of holding members corresponding to the retaining members and a plurality of assembling members corresponding to the fastening member. The retaining members and the holding members are correspondingly assembled together to assemble the first frame unit to the panel unit, and the fastening members and the assembling members are correspondingly assembled together to assemble the second frame unit to the panel unit.

15 Claims, 4 Drawing Sheets

HOUSING OF PORTABLE ELECTRONIC DEVICE

BACKGROUND

1. Technical Field

The present disclosure relates to housings of portable electronic devices, and particularly to a housing of a portable electronic device that can be assembled without using bolts or screws.

2. Description of Related Art

Portable electronic devices, such as mobile phones, personal digital assistants (PDA), and laptop computers, are widely used. In assembly, housings of the portable electronic devices are generally assembled by bolts or snap fasteners. However, both types of fasteners have shortcomings. Bolts require holes in the housings, which can weaken the housings. Additionally, the stress of installing the bolts may damage the housings. On the other hand, although snap fasteners do not require the holes nor cause damage when installed do provide as secure an assembly, firmness of housings assembled by snap fasteners is generally lower than firmness of housings assembled by bolts.

Therefore, there is room for improvement within the art.

BRIEF DESCRIPTION OF THE DRAWINGS

Many aspects of the present housing of portable electronic devices can be better understood with reference to the following drawings. The components in the various drawings are not necessarily drawn to scale, the emphasis instead being placed upon clearly illustrating the principles of the present housing of portable electronic device. Moreover, in the drawings, like reference numerals designate corresponding parts throughout the figures.

DETAILED DESCRIPTION

Figure 1:
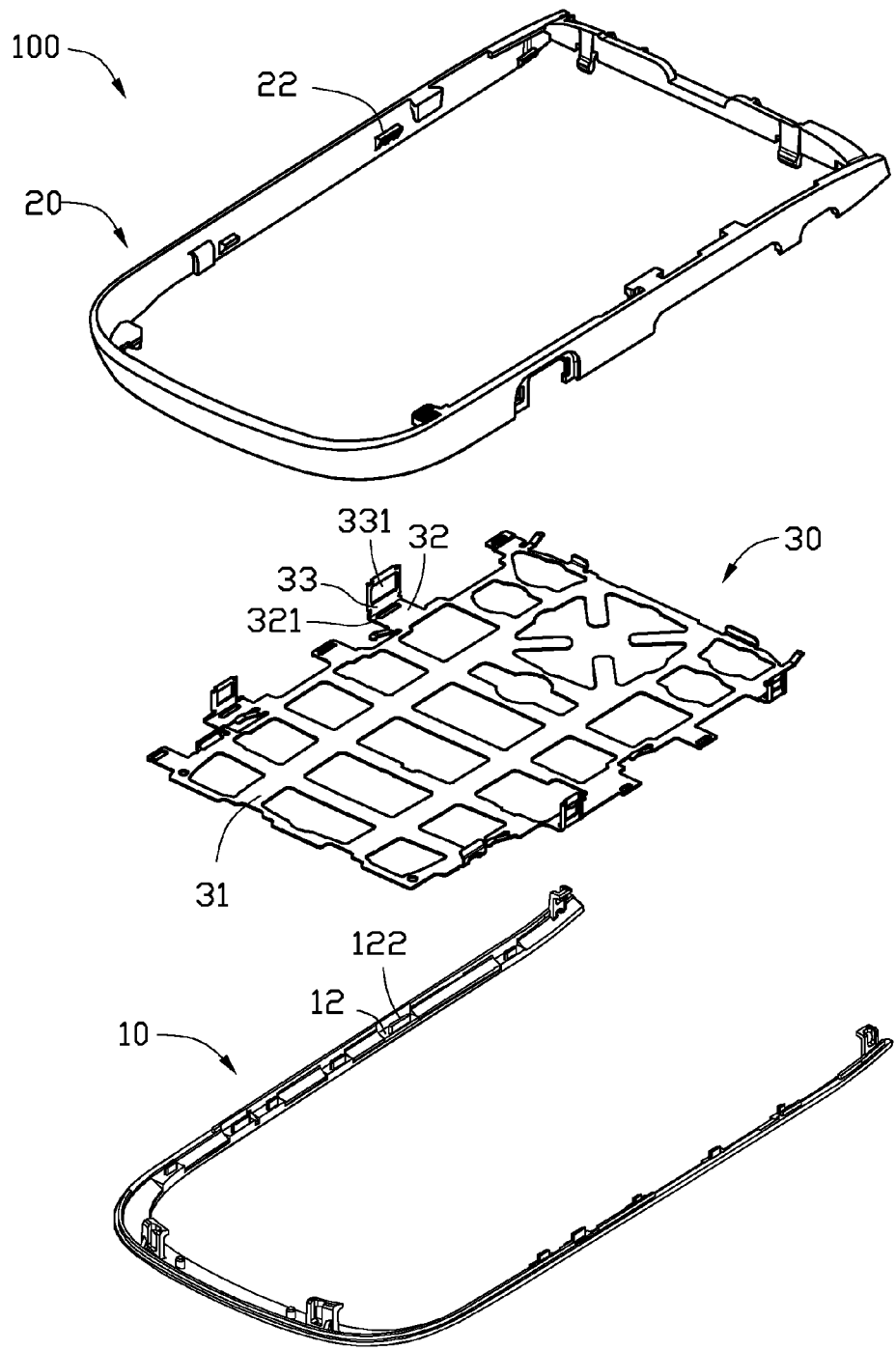
FIG. 1 is a disassembled view of a housing of portable electronic device, according to an exemplary embodiment.
Figure 2:
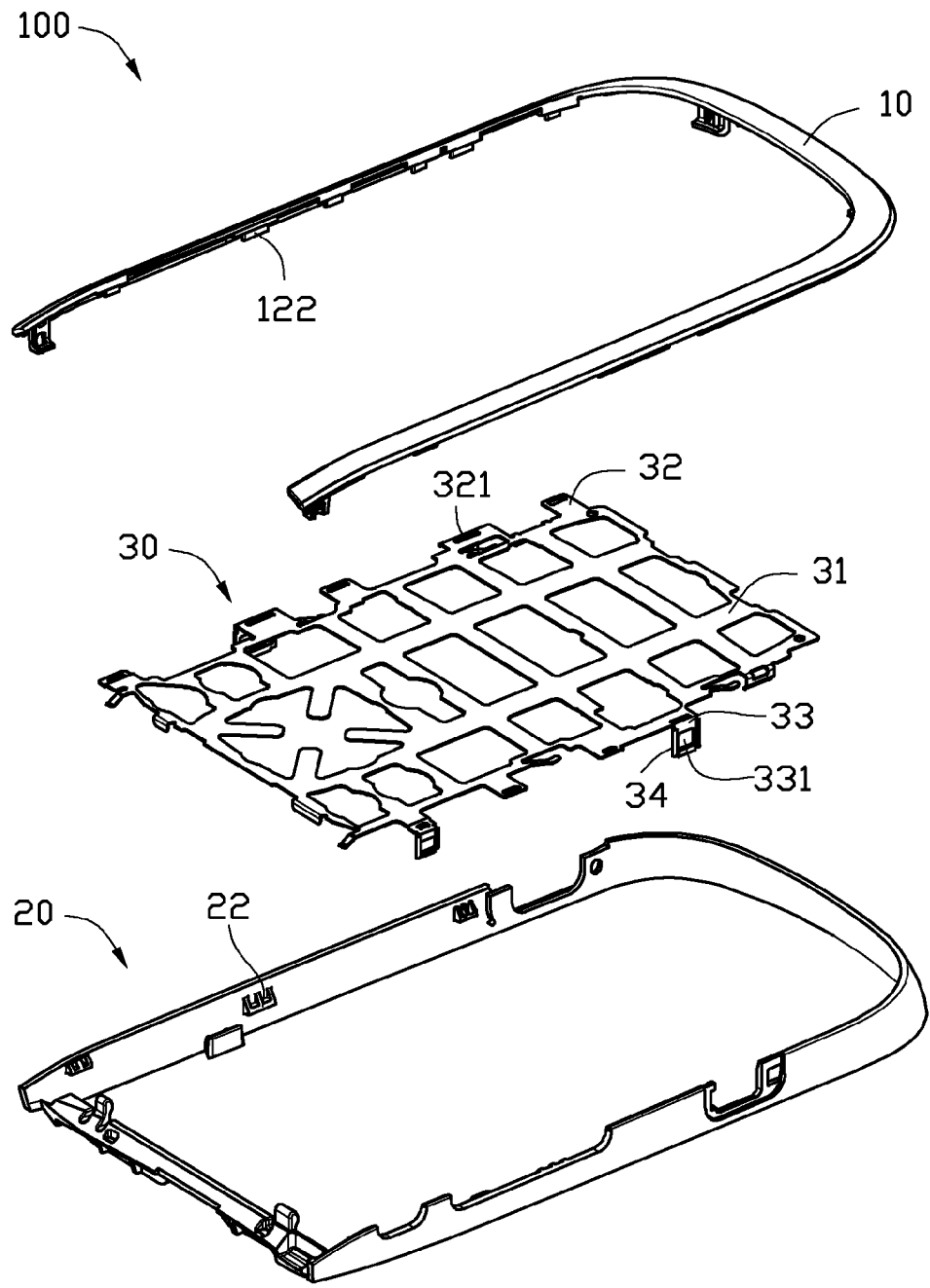
FIG. 2 is similar to FIG. 1, but shown from another angle.

FIG. 1 and FIG. 2 show a portable electronic device housing 100, according to an exemplary embodiment. The housing 100 can be used in portable electronic devices, such as mobile phones, personal digital assistants (PDA), and MP3/MP4 players. The housing 100 includes a first frame unit 10, a second frame unit 20, and a panel unit 30.

The first frame unit 10 is a substantially U-shaped frame. The first frame unit 10 includes a plurality of retaining portions 12 and a plurality of retaining members 122 corresponding to the retaining portions 12. The retaining portions 12 are planar areas formed on an edge of the first frame unit 10. The retaining members 122 are bar-shaped protrusions correspondingly formed on the retaining portions 12, wherein each retaining member 122 has a side connected to a corresponding retaining portion 12.

Figure 4:
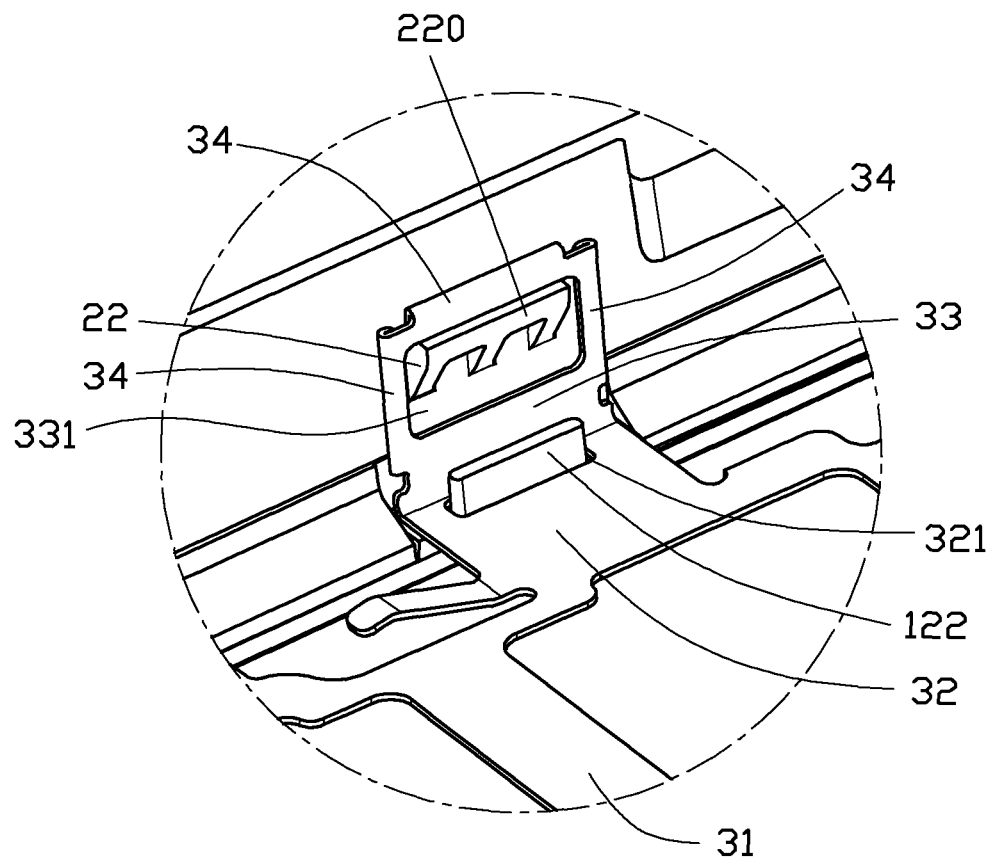
FIG. 4 is an enlarged view of the portion IV shown in FIG. 3.

The second frame unit 20 is a substantially rectangular frame. The shape and size of the second frame unit 20 generally correspond to the shape and size of the first frame unit 10. The second frame unit 20 includes a plurality of fastening members 22. The fastening members 22 are protrusions formed on an inward surface of the second frame unit 20, and the fastening members 22 are positioned to correspond to the assembling portions 12 of the first frame unit 10. Also referring to FIG. 4, each fastening member 22 includes an inclined snap engagement surface 220 formed thereon, and the snap engagement surfaces 220 of all the fastening members 22 are positioned towards a same side of the second frame unit 20.

The panel unit 30 can be a keypad body of a portable electronic device. The panel unit 30 includes a main body 31, a plurality of holding members 32, and a plurality of assembling members 33. The main body 31 is a substantially rectangular sheet, and the shape and size of the main body 31 generally correspond to the shapes and sizes of the first frame unit 10 and the second frame unit 20.

The holding members 32 are substantially rectangular sheets connected to the main body 31. The main body 31 and the holding members 32 are coplanar. The positions, shapes and sizes of the holding members 32 correspond to the positions, shapes and sizes of the retaining portions 12, and each holding member 32 defines a holding hole 321 corresponding to the retaining members 122 therein. When the panel unit 30 is received in the first frame unit 10, the holding members 32 can correspondingly engage with the retaining portions 12, and the retaining members 122 can be correspondingly received in the holding holes 321.

The assembling members 33 are substantially rectangular sheets perpendicularly connected to the distal end of each holding member 32. Since the holding members 32 and the fastening members 22 are positioned to correspond to the retaining portions 12, then it follows that the assembling members 33 connected to the holding members 32 are also positioned corresponding to the retaining members 12 and the fastening members 22. Each assembling member 33 defines an assembling hole 331 corresponding to the fastening members 22 therein. When the panel unit 30 is received in the second frame unit 20, the fastening members 22 can be correspondingly received in the assembling holes 331. The distal end and two sides of each assembling member 33 curl back on themselves to form three protecting portions 34 that have cambered outside surfaces.

Figure 3:
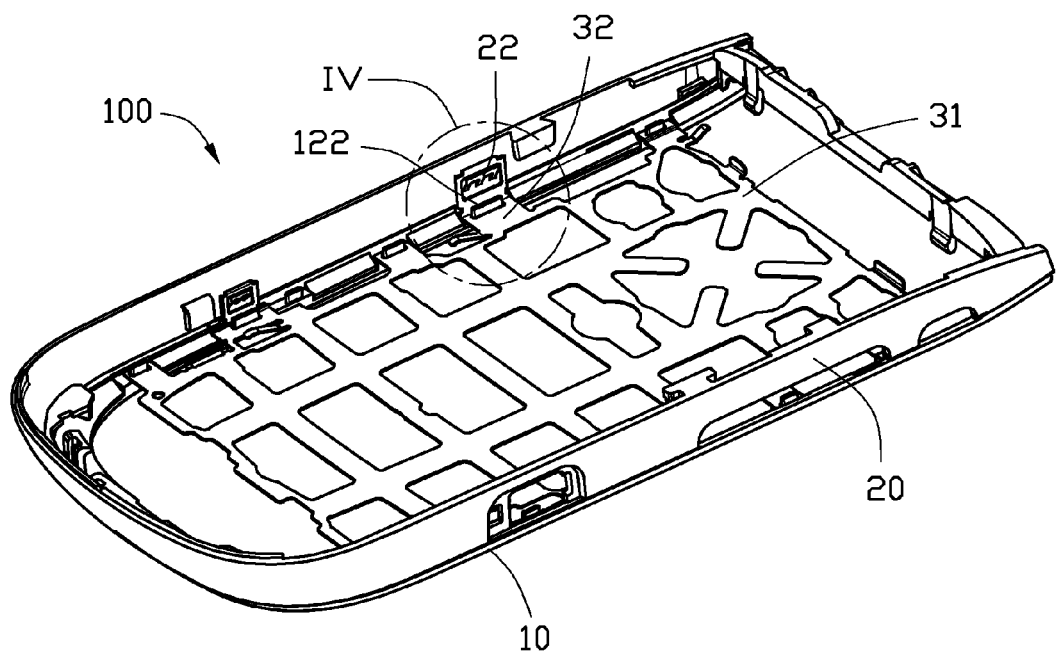
FIG. 3 is an assembled view of a housing of portable electronic device shown in FIG. 1.

Also referring to FIG. 3, in assembly, the panel unit 30 is first received in the first frame unit 10. The holding members 32 are positioned to correspondingly engage with the retaining portions 12, and the retaining members 122 are correspondingly inserted into the holding holes 31 and thereby received in the holding holes 321. Thus, the retaining members 122 and the holding members 31 are correspondingly assembled together, and the first frame unit 10 is assembled to the panel unit 30.

The second frame unit 20 is aligned with the panel unit 30, with the snap engagement surfaces 220 of all the fastening members 22 positioned towards the panel unit 30. The second frame unit 22 is then pressed towards the panel unit 30, such that the assembling members 33 are driven to slide along the inward surface of the second frame unit 22. Thus, the assembling members 33 are pressed by the snap engagement surfaces 220 of the fastening members 22, correspondingly, and are then bent inwards and driven to slide past the snap engagement surfaces 220 of the fastening members 22; until the assembling holes 331 defined in the assembling members 33 are correspondingly aligned with the fastening member 33, the assembling members 33 rebound, and the fastening members 22 are correspondingly received in the assembling holes 331. Due to the cambered outside surfaces of the protecting portions 34, the protecting portions 34 can facilitate the assembling members 33 sliding along the inward surface of the second frame unit 20 and snappingly engage with the snap engagement surfaces 220 of the fastening members 22, and protect the second frame unit 20 from being scraped by the edge of the assembling members 33. In this way, the fastening members 22 and the assembling members 33 are correspondingly assembled together, such that the second frame unit 20 is also assembled to the panel unit 30, and the housing 100 is then completed. Additionally, assembly of the first frame unit 10 and the second frame unit 20 can be secured by additional conventional means, such as with glue.

In the present housing 100, the panel unit 30 is assembled to the first frame member 10 by the holding members 32, and is also assembled to the second frame 20 by the assembling members 33. Compared with conventional housing assembled with snap fasteners, the housing 100 provides a more secure assembly without the need for holes such as with the use of bolts.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A housing of a portable electronic device, comprising:
    a first frame unit including a plurality of retaining members;
    a second frame unit including a plurality of fastening members; and
    a panel unit including a plurality of holding members corresponding to the retaining members and a plurality of assembling members corresponding to the fastening members; wherein the retaining members and the holding members are correspondingly assembled together to assemble the first frame unit to the panel unit, and the fastening members and the assembling members are correspondingly assembled together to assemble the second frame unit to the panel unit;
    wherein the assembling members perpendicularly connected to the holding members, each assembling member defines an assembling hole therein; the fastening members are protrusions formed on the second frame unit, the fastening members are received in the assembling holes; a distal end and two sides of each assembling member curl back on themselves to form three protecting portions that have cambered outside surfaces.

2. The housing as claimed in claim 1, wherein the panel unit further includes a main body, the holding members being sheets connected to the main body, and the assembling members being sheets connected to the holding members.

3. The housing as claimed in claim 2, wherein the main body is a planar sheet, the holding members and the main body are positioned coplanar, and the assembling members perpendicularly connected to distal ends of the holding members.

4. The housing as claimed in claim 3, wherein the first frame unit includes a plurality of retaining portions, the retaining portions being planar areas formed on the first frame unit, the retaining members being protrusions formed on the retaining portions.

5. The housing as claimed in claim 4, wherein the holding members engage with the retaining portions.

6. The housing as claimed in claim 5, wherein each holding member defines a holding hole therein, the retaining members received in the holding holes to assemble the retaining members and the holding members together.

7. The housing as claimed in claim 1, wherein each fastening member includes an inclined snap engagement surface positioned towards the panel unit.

8. The housing as claimed in claim 1, wherein the first frame unit and the second frame unit are secured together.

9. A housing of a portable electronic device, comprising:
    a first frame unit including a plurality of protruding retaining members;
    a second frame unit including a plurality of protruding fastening members; and
    a panel unit defining a plurality of holding holes corresponding to the retaining members and a plurality of assembling holes corresponding to the fastening members, the retaining members received in the holding holes to assemble the first frame unit to the panel unit, and the fastening members received in the assembling holes to assemble the second frame unit to the panel unit;
    wherein the panel unit includes a plurality of holding members and a plurality of assembling members; the assembling members are perpendicularly connected to the holding members; the holding holes defined in the holding members, and the assembling holes defined in the assembling members; a distal end and two sides of each assembling member curl back on themselves to form three protecting portions that have cambered outside surfaces.

10. The housing as claimed in claim 9, wherein the panel unit includes a main body; the holding members being sheets connected to the main body, and the assembling members being sheets connected to the holding members.

11. The housing as claimed in claim 10, wherein the main body is a planar sheet, the holding members and the main body positioned coplanar, and the assembling members perpendicularly connected to distal ends of the holding members.

12. The housing as claimed in claim 11, wherein the first frame unit includes a plurality of retaining portions, the retaining portions being planar areas formed on the first frame unit, the retaining members being protrusions formed on the retaining portions.

13. The housing as claimed in claim 12, wherein the holding members engage with the retaining portions.

14. The housing as claimed in claim 11, wherein each fastening member includes an inclined snap engagement surface positioned towards the panel unit.

15. The housing as claimed in claim 9, wherein the first frame unit and the second frame unit are secured together.

* * * * *